United States Patent [19]
Klein et al.

[11] 3,809,997
[45] May 7, 1974

[54] GENERATOR SYSTEM WITH LINEAR REVERSIBLE OUTPUT

[75] Inventors: Enrique J. Klein, 848 Boyce Ave., Palo Alto, Calif. 94301; Myron E. Lee, Palo Alto, both of Calif.

[73] Assignee: said Klein, by said Lee

[22] Filed: Apr. 9, 1973

[21] Appl. No.: 349,203

[52] U.S. Cl............... 322/79, 310/68 D, 321/28, 322/96
[51] Int. Cl. ............................................. H02p 1/22
[58] Field of Search............ 321/28, 62, 29, 30, 31; 310/68, 68 D; 322/31, 79, 95, 96

[56] References Cited
UNITED STATES PATENTS

| | | | |
|---|---|---|---|
| 2,917,699 | 12/1959 | Grant | 322/96 X |
| 3,408,556 | 10/1968 | Gabor | 322/95 |
| 3,508,137 | 4/1970 | Hill | 321/28 |

*Primary Examiner*—James D. Trammell

[57] ABSTRACT

System for providing a DC signal linearly proportional through zero to the angular velocity of rotation of a shaft, and for providing a change of signal polarity with a reversal of the sense of rotation. A brushless generator having a magnetic rotor turning within a stator which includes a number of coils mounted within a magnetic return path ring. Trapezoidally shaped signals are produced by the coils when the magnetic rotor is driven. These signals are summed in one of several alternative electronic circuits, all functioning as peak detecting devices and including as elements operational amplifiers, diodes and field-effect transistors interconnected in such a way that the output will result in a smooth DC signal. The polarity of this signal is controlled by a switch operated by a friction sensitive device responsive to sense of rotation which is mounted on the generator shaft.

17 Claims, 9 Drawing Figures

GENERATOR SYSTEM WITH LINEAR REVERSIBLE OUTPUT

BACKGROUND OF THE INVENTION

1. Field of the Invention

The present invention relates in general to electromagnetic generators and rectification circuitry, and in particular to an improved tachometer coupled to novel electronic circuitry which in combination can develop a unidirectional electrical signal which is proportional to the angular velocity of rotation of a shaft, provides a straight line output that goes through zero and exhibits two different polarities for clockwise and counterclockwise rotation.

2. Discussion of the Prior Art

Tachometers are important components on most servo-systems involving control of rotary or linear motions. Servo-systems using DC signals make use of either AC tachometers with a rectification circuit or conventional DC tachometers embodying mechanical commutation. The drawback of an AC tachometer using an electronic rectifier is that most AC generators are designed to produce a sinusoidal output which after rectification requires heavy filtering to provide a smooth DC signal. This electronic filtering decreases the frequency response of the feedback control which in turn limits the performance of the servo-system. DC tachometers with mechanical commutation generally provide a smoother DC signal but the mechanical commutator, with its brushes rubbing against the commutator bars, introduces spurious random noise which gets progressively worse with wear. This noise and its filtering is also detrimental to the performance of a servo-system.

A tachometer having a trapezoidal, as opposed to a sinusoidal, output has the potential for providing a smooth DC signal ideally suited for servo-system applications. Several configurations of such a tachometer were disclosed in applicant Klein's co-pending application entitled BRUSHLESS GENERATOR, Ser. No. 254,414, filed on May 18, 1972. The aforementioned application teaches an electronic rectification circuit which, in combination with the generator, is capable of delivering a smooth DC signal that is a linear function of the angular velocity of the tachometer shaft, but in which the output will show a discontinuity near zero, and the polarity of the output signal will remain unchanged with a reversal in the sense of rotation of the shaft.

A tachometer of this type coupled with novel electronic summation circuits, as disclosed in the present application, is meant to overcome the above mentioned difficulties by teaching a system that, using state of the art technology, can be built at a low cost and can provide a DC signal with low ripple content, linearly related to the angular velocity with no zero offset, which changes polarity in accordance with the sense of rotation.

SUMMARY OF THE INVENTION

An object of the present invention is to provide a tachometer combined with a summation circuit which develops a low ripple unidirectional electrical signal.

Another object of the present invention is to provide a tachometer combined with a summation circuit which develops an output voltage that changes in linear relationship with the angular velocity of the tachometer shaft from zero onwards.

Yet another object of the present invention is to provide a tachometer combined with a summation circuit in which the reversal of the shaft's sense of rotation will cause a reversal in the polarity of the output signal.

Still further objects and advantages will appear in the more detailed descriptions given below.

In accordance with the present invention there is provided a tachometer including a freely rotating magnetic rotor assembly comprising a permanent magnet with pole pieces, mounted on a shaft, and surrounded by a non-magnetic gap containing a number of wire coils fixed by a coil holder member to the interior surface of a magnetic return path ring. This entire assembly is contained in a cylindrical casing. A frictional drag sensitive switch to detect sense of rotation is also mounted on the shaft. The above mentioned components are arranged so that upon the relative motion of the rotor inside the stator, a series of trapezoidally shaped positive and negative signals are generated by each coil. The tachometer, according to the present invention, incorporates a peak detecting summation circuit which accurately converts the trapezoidal signals into a DC voltage proportional to the amplitude of these signals. Positive and negative DC voltages of equal magnitude are obtained simultaneously and the appropriate polarity is selected by the frictional drag sensitive switch so that the polarity of the output signal is determined by the sense of rotation of the shaft. The rectification and summation circuit consists of highly accurate rectifiers which incorporate diodes in conjunction with amplifiers to minimize conversion errors.

Preferred forms of the present invention are shown in the accompanying drawings wherein:

IN THE DRAWING

DETAILED DESCRIPTION OF THE INVENTION

Figure 1:
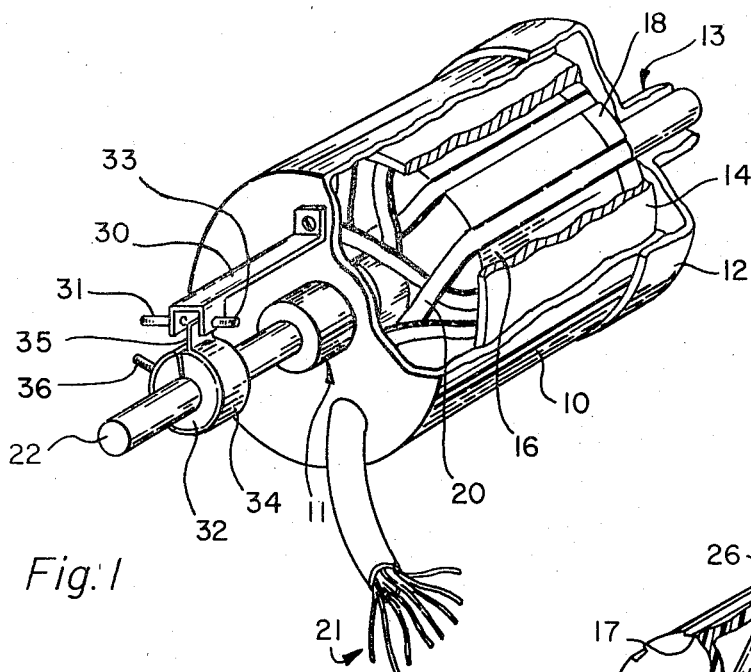
FIG. 1 is a partially sectioned view of a tachometer according to the present invention.
Figure 2:
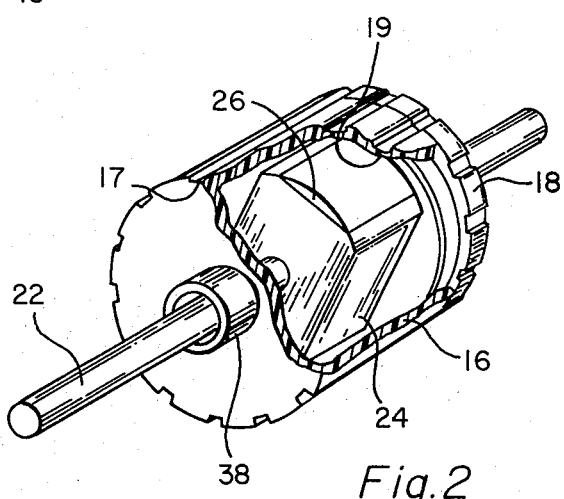
FIG. 2 is a partially sectioned view of a coil holder, adapted for external coil winding, enclosing a permanent magnet rotor on a shaft.
Figure 3:
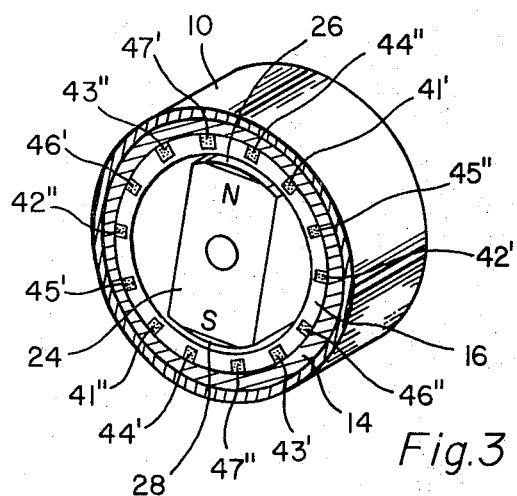
FIG. 3 shows a cross section of a tachometer as in FIG. 1, showing the geometrical arrangement of a 2-Pole, 7-Coil configuration.
Figure 7:
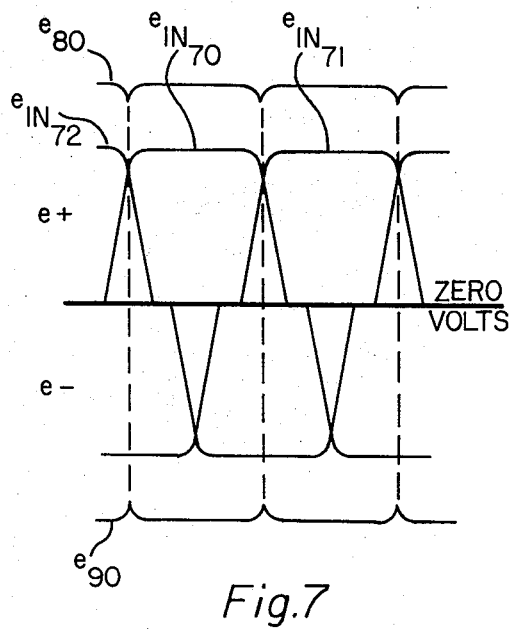
FIG. 7 is a diagramatic detail of the electromotive force signal crossovers for a tachometer embodiment as in FIG. 3 and of the output signals from a rectification circuit as shown in FIG. 6.
Figure 8:
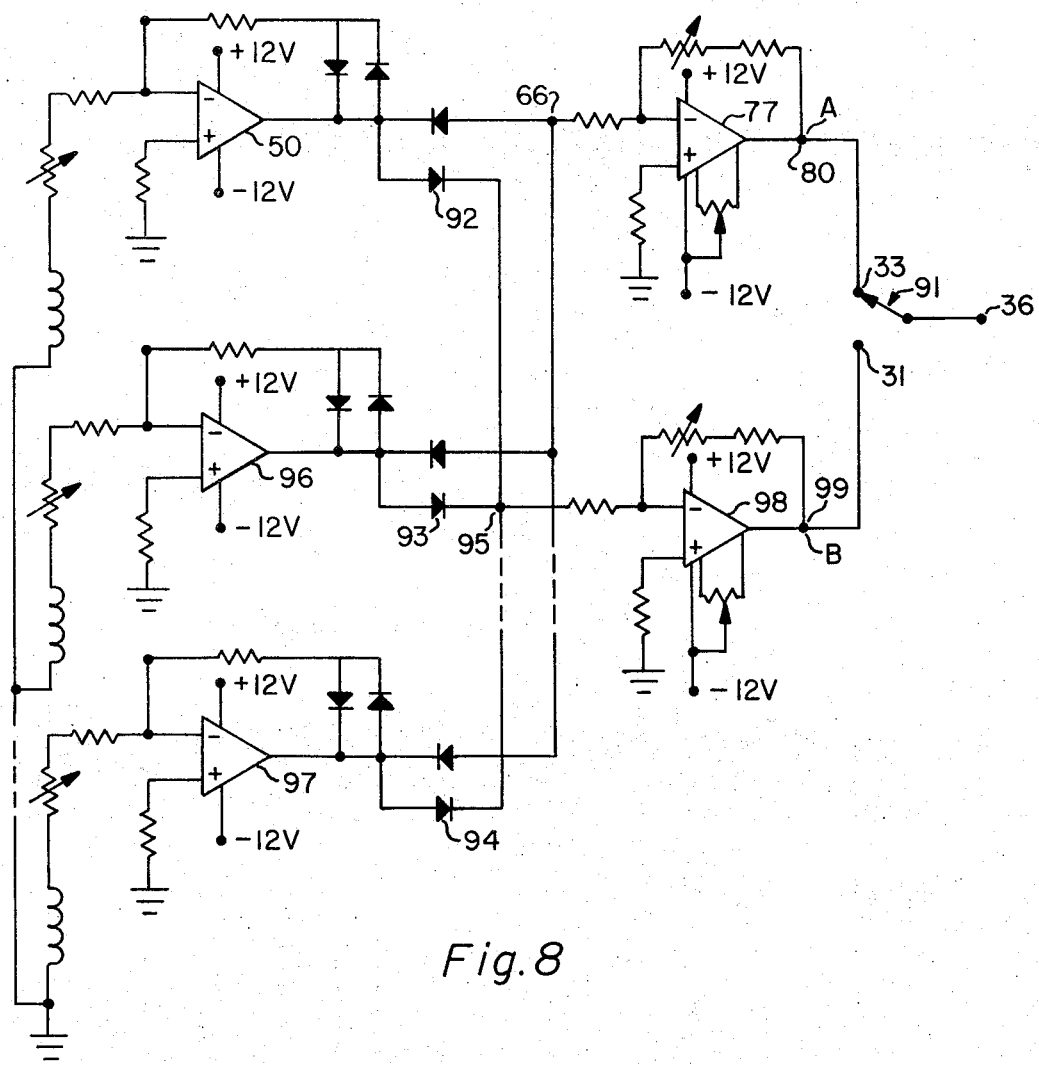
FIG. 8 is a diagram of an alternative peak detecting rectification and summation circuit for a tachometer according to the present invention.
Figure 9:
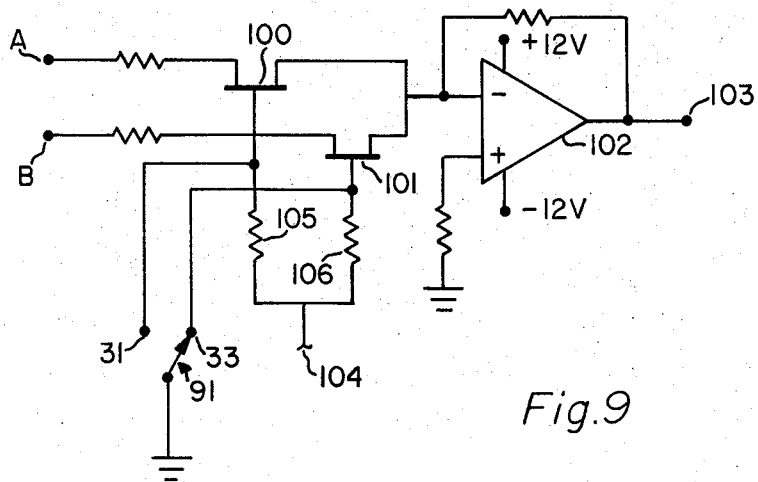
FIG. 9 is a diagram of an alternative method of polarity selection that can be added to a rectification and summation circuit.

Reference is now made to FIG. 1 through FIG. 3 of the drawing for a description of one embodiment of the tachometer according to the present invention. Reference is made later to FIG. 4 through FIG. 7 to describe the operation of a preferred embodiment of a peak detecting rectification and summation circuit. FIG. 8 and FIG. 9 are referred to in connection with alternative circuitry in accordance with this invention.

The tachometer embodiment of FIGS. 1, 2, and 3 consists essentially of a stator, a rotor and a friction drag sensitive switch. The stator is formed by a two-part housing 10 and 12, shown partially cut away in FIG. 1, a magnetic return path member 14, shown also cut open, and a coil holder member comprising portions 16 and 18. A plurality of stator windings or coils 20 are fixedly mounted on the aforementioned coil holder and their accessible terminals 21 exit through housing 10. The rotor, as shown more clearly in FIG. 2, includes a shaft 22 and a permanent magnet member 24 with two pole pieces 26 and 28. The frictional drag sensitive switch as depicted in FIG. 1 includes two main parts: a stationary main body 30 and a slipping member which is formed by a split bushing 32 and a spring clip 34.

The cup shaped portion of the housing 10 and its closure member 12 contain all the other components of the tachometer and member 10 supports the main body 30 of the drag switch. The magnetic return path member 14 is in the shape of an annulus with no indentations or teeth. It is preferably made out of a soft magnetic material such as silicon iron and can be assembled out of a series of thin annular laminations to reduce the eddy currents through the material. Both portions of the coil holder member, cup shaped portion 16 and lid portion 18, are preferably made out of a nonmagnetic material, such as a suitable plastic, and in the present embodiment are provided with external grooves or slots 17 that leave a thin web 19 at the bottom of the groove. Each one of the slots 17 accommodates a bundle from a multiturn wire coil 20. Permanent magnet member 24, made out of material such as Alnico V, is fixedly mounted on the non-magnetic shaft 22 by bonding it with an adhesive such as epoxy. Pole pieces 26 and 28, made out of a soft magnetic material like iron, have the general cross sectional shape of a segment of a circle and are similarly bonded to flattened portions of the permanent magnet member using an epoxy glue. In the frictional drag sensitive switch shown in FIG. 1, the stationary main body 30 has two lugs which carry terminals 31 and 33 respectively, both being electrically insulated from the casing and from each other. Split bushing 32 is preferably made out of a low-friction self-lubricating material, such as a fluorocarbon and is lightly pressed against shaft 22 by the resilient spring clip 34 which has one end attached to the bushing and the other free to urge the bushing to close around shaft 22. Spring clip 34, which is preferably made out of a metallic spring material, has an extension 35 that fits between the two lugs of the main body 30 and can alternatively effect electrical contact with terminals 31 or 33. Clip 34 also has a terminal 36 that is electrically connected to lug 35 but insulated from shaft 22.

To assemble this embodiment of the tachometer, the rotor must first be independently assembled, then it is inserted in the cup shaped portion 16 of the coil holder and then the rotor is held captive by closing the lid portion 18 against the cup portion 16. The permanent magnet portion of the rotor 24 has a uniform gap between its outer perimeter and the interior of cup member 16 when held concentric with it. The coil holder assembly can then be used to wind the wire coils into the slots. In the present embodiment, the wire bundles of any one coil lie in grooves that face each other across a diameter and therefore the winding can be done using automatic machinery. Bosses 38 and 40 (not shown) are provided to deflect the wires away from shaft 22. A terminal board (not shown) can also be provided to attach the fine terminal wires from each coil and the heavier lead wires 21 that connect to the external circuitry. The entire unit is assembled by inserting the rotor assembly with the terminal board and the magnetic return path 14 into the cup portion 10 of the housing and then attaching the closure member 12. Bearings for shaft 22 are provided within the bosses 11 and 13 of the housing and not by bosses 38 and 40 of the coil holder. The drag sensitive switch is then attached to the tachometer to complete the mechanical assembly.

Figure 4:
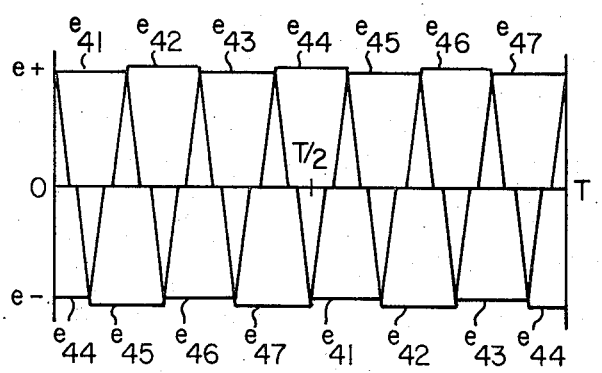
FIG. 4 is a diagram of the electromotive forces induced in each coil of the FIG. 3 embodiment during one complete revolution of the magnetic rotor.

The principle of operation of a tachometer according to the present invention, as well as the specific geometrical arrangement of the rotor, the non-magnetic gaps, the coils and the magnetic return paths, are discussed in detail in applicant Klein's co-pending application entitled BRUSHLESS GENERATOR, Ser. No. 254,414 filed on May 18, 1972. The above mentioned disclosure sets forth the conditions under which such a novel tachometer can generate a series of both positive and negative trapezoidally shaped voltage signals with essentially flat tops and phased so that they will intersect at or near their shoulders providing a positive and a negative voltage output whose envelopes are quite flat and free of ripple, and in which the zero to peak amplitude is proportional to the angular velocity of the tachometer shaft. This wave-shape is illustrated in FIG. 4 for the 2-pole, 7-coil configuration depicted in FIG. 3. The diagram shows the trapezoidal signals from all coils for one complete revolution of the magnetic rotor. The amplitudes of the separate signals are shown slightly staggered to make it easier to distinguish them from each other. Coils 41, 42, 43, 44, 45, 46, and 47 are identified in FIG. 3 by the primed and double primed numbers attached to corresponding wire bundles such that, for example, bundles 41' and 41'' belong to coil 41. The electromotive forces induced in each coil by the motion of the magnetic rotor relative to the stator are similarly identified in FIG. 4 by the coil number.

In the above mentioned co-pending application, the rectification and summation of the tachometer output signals was accomplished using a simple seven-phase full-wave peak detecting circuit incorporating seven diode pairs. While this circuit will provide a smooth unidirectional output which is generally linear in relation to the angular velocity of the shaft, the output will show a discontinuity near zero angular velocity and the circuit is not capable of changing the polarity of the output with a reversal in the sense of rotation. This discontinuity in the output is due to the behavior of the diodes, which show an output voltage essentially equal to zero unless the input voltage exceeds 0.6 Volt (in the case of silicon diodes). These two features render the conventional diode rectifier inadequate for precision control applications, particularly where low speeds are involved. To overcome these drawbacks, the present invention discloses a rectification and summation circuit which, in combination with a shaft mounted frictional drag sensitive switch, can provide a low ripple unidirectional voltage signal that remains a linear function of velocity down to zero rpm and changes its polarity with a reversal in the sense of rotation of the shaft.

Figure 5:
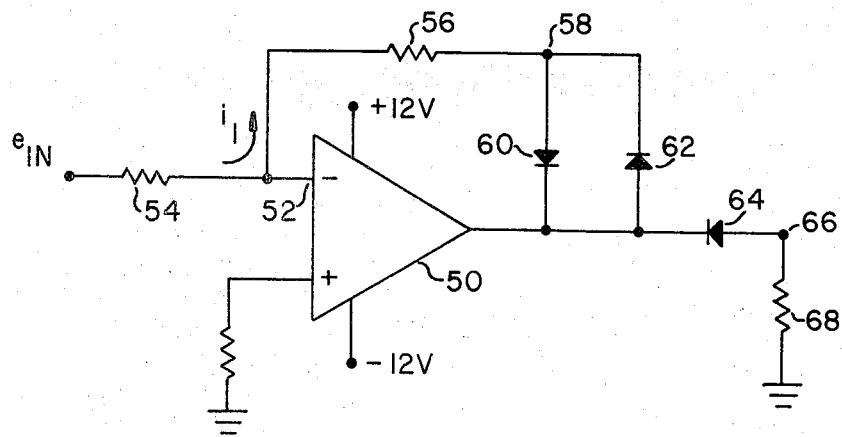
FIG. 5 is a schematic diagram of an amplifier module as used in a signal rectification and summation circuit according to te present invention.
Figure 6:
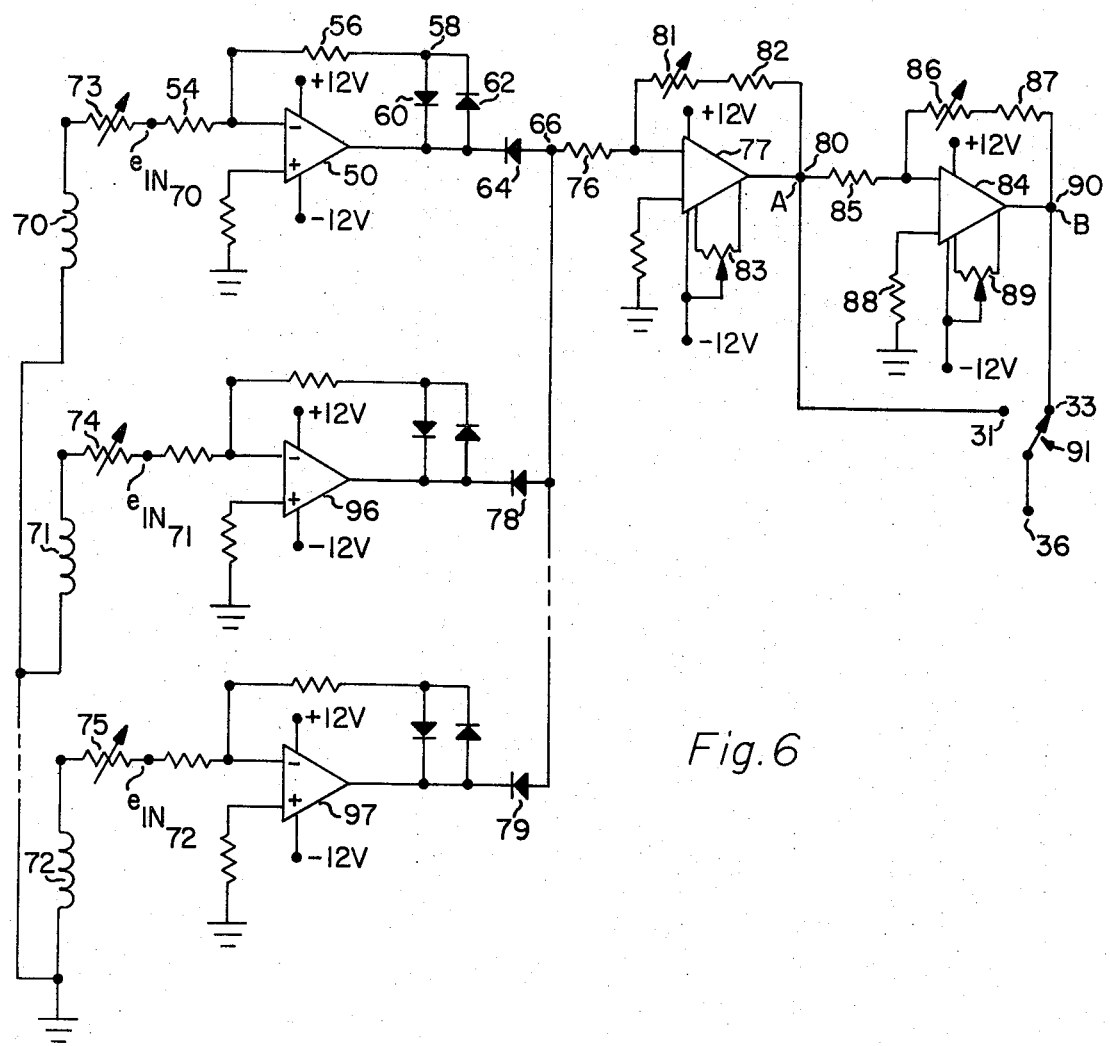
FIG. 6 is a diagram of a complete peak detecting rectification and summation circuit connected to the coils of a tachometer.

A preferred embodiment of the rectification and summation circuit as shown in FIG. 6 can best be described on the basis of a single amplifier module in the form of a unidirectional inverter as illustrated in FIG. 5. In FIG. 5 the operational amplifier 50 driven by a +12 Volts and −12 Volts power supply is considered as an ideal amplifier, i.e., having infinite gain, zero input current and zero output impedance. If this is the case, the voltage at the negative input terminal 52 of the amplifier will be zero for all input voltages $e_{IN}$. The input current will then be $$i_1 = e_{IN}/R_{54}$$

Since the input current to the amplifier is zero, the same current ($i_1$) must flow through resistor 56, and $$e_{58} = -R_{56} \cdot i_1$$

Substituting $i_1$ from the first equation into the second gives $$e_{58} = -R_{56}/R_{54} \cdot e_{IN}$$

which demonstrates that the voltage at point 58 is directly proportional to the input voltage $e_{IN}$. Diode 60 conducts for positive input voltages and diode 62 conducts for negative input voltages. If the forward biased voltage versus current characteristics of diodes 60 and 64 are closely matched, and the current is the same through each diode, then $$e_{58} = e_{66} = -R_{56}/R_{54} \cdot e_{IN}$$

for all positive input voltages. For negative input voltages $e_{66} = 0$. The current through diode 60 will be the same as through diode 64 if resistor 68 has the same value as resistor 56. At this time there are several commercially available integrated circuit amplifiers with characteristics that resemble an ideal amplifier closely enough to make any errors quite small.

Based on the amplifier module of FIG. 5, it is now possible to assemble a complete rectification and summation circuit and connect it to a tachometer according to this invention. Such a circuit is shown schematically in FIG. 6 for three coils of a seven-coil tachometer. The output of each one of coils 70, 71 and 72 is tied to a separate amplifier module through variable resistors 73, 74, and 75 respectively. These resistors are used to even out the zero to peak output levels from each coil and thus further minimize the ripple. The input resistor 76 going to buffer amplifier 77 serves as the load resistor for all rectifiers. Only one of the diodes 64, 78, and 79 will normally conduct at any one time; the one with the most negative voltage at the cathode. The voltage $e_{66}$ will therefore be directly proportional in magnitude and of opposite polarity to the envelope of the positive peaks of the waveforms from all the coils. This is graphically shown in FIG. 7.

Buffer amplifier 77 is an inverting amplifier with a gain of $$e_{80}/e_{66} = -R_{81} + R_{82}/R_{76}$$

Variable resistor 81 can be used to adjust the voltage gradient factor of the tachometer in Volts/rpm for a first sense of rotation. Potentiometer 83 is used to adjust any zero offset in the system. Amplifier 84 with its associated resistors 85, 86, 87, 88, and potentiometer 89, is a unity gain inverting amplifier wherein $e_{90}$ is equal in magnitude and opposite in polarity to the output voltage $e_{80}$ of amplifier 77, as shown in FIG. 7. The outputs $e_{80}$ and $e_{90}$ both reach switch 91 at terminals 31 and 33, respectively. Switch 91 is the frictional drag sensitive device of FIG. 1. Thus, when the tachometer shaft rotates clockwise when viewed from the end carrying the switching device, output terminal 36 will be connected to terminal 33 and $e_{OUT}$ will be positive. Conversely, when the rotation is counterclockwise, terminal 36 will be switched to terminal 31 and $e_{OUT}$ will be negative. This relationship can, of course, be reversed by interchanging the leads to terminals 31 and 33.

A variety of rectification and summation schemes can be devised according to the present invention. One such alternative method involves the detection of the negative output peaks from the tachometer as well as the positive ones. In this scheme, the positive peaks can be used to produce a positive unidirectional voltage and the negative peaks to produce a negative unidirectional voltage. A circuit adapted to perform these functions is shown in FIG. 8 for three coils of a seven-coil tachometer. The three amplifier modules in FIG. 8 remain unchanged from those in FIG. 6. Diodes 92, 93, and 94 are added in order to detect the envelope of the peak negative signals from the tachometer. Thus, $e_{66}$ still represents a negative value of the peak positive signals from the tachometer as inverted by amplifiers 50, 96, and 97, while $e_{95}$ is the corresponding positive value derived from the peak negative signals from the tachometer as passed by amplifiers 50, 96, and 97. As in the circuit of FIG. 6, amplifier 77 inverts the negative voltage $e_{66}$ providing a positive signal $e_{80}$ while amplifier 98 inverts the positive signal $e_{95}$ to provide a negative signal $e_{99}$. Frictional drag sensitive switch 91 then selects the appropriate output signal from terminals 31 and 33. It should be clear from the foregoing that both the scheme of FIG. 6 and the embodiment of FIG. 8 provide at all times a positive and a negative signal of equal value at terminals 31 and 33 respectively. The difference is that in one case both signals are derived from the peak positive output waveforms of the tachometer, while in the other, the positive signal is derived from the peak positive waveforms and the negative signal from the peak negative waveforms.

The sense of rotation detecting switch could introduce unwanted noise in the output signal going through it. This can be solved by using an alternative switching scheme in which only the control signals for two field effect transistors (FETs), and not the output signals themselves, are led to the sense of rotation detecting switch. Such a circuit is shown in FIG. 9 wherein terminals A and B are connected to the output terminals A and B of the rectification and summation circuits in FIG. 6 or FIG. 8. The gates of FETs 100 and 101 are controlled by the position of switch 91, so that when contact 33 is closed, the gate of FET 101 is grounded causing it to conduct and thus connecting the negative terminal B to the buffer amplifier 102 which provides a positive output voltage $e_{103}$. At the same time FET 100 remains in the nonconducting state with its gate drawn to a DC biasing voltage level $V_{104}$ through resistor 105. When contact 31 of switch 91 is closed, FET 101 will be nonconducting and FET 100 will conduct providing a negative output voltage $e_{103}$ through amplifier 102.

While several forms of this invention have been disclosed in detail, it is understood that this description is given by way of illustration and explanation only, and not by way of limitation, since various changes therein may be made by those skilled in the art without departing from the scope and spirit of the invention.

Having thus described the invention, what is claimed is:

1. Tachometer apparatus, comprising:
   a signal generator responsive to rotary motion and operative to develop a plurality of individual AC signals having peak amplitudes proportional to the rotational velocity of said rotary motion;
   circuit means for rectifying and summing said AC signals to develop continuous DC potentials of two polarities having magnitudes proportional to the rotational velocity of said rotary motion;
   output means responsive to at least one of said DC potentials and operative to develop a pair of output signals proportional to said DC signal, said output signals being of like magnitude but of opposite polarity; and
   switching means responsive to the direction of rotation of said rotary motion and operative to couple one of said output signals to an output terminal when said motion is in one direction, and to couple the other of said output signals to said output terminal when said motion is in the opposite direction.

2. Tachometer apparatus as recited in claim 1 wherein said generator includes a permanent magnet rotor and a plurality of individually wound stator windings interrelated such that said AC signals have trapezoidal wave forms.

3. Tachometer apparatus as recited in claim 2 wherein said circuit means includes a plurality of unidirectional inverter circuits each having an input coupled to a corresponding one of said stator windings, and a first output coupled to a first common circuit point.

4. Tachometer apparatus as recited in claim 3 wherein said output means includes a pair of inverter circuits connected in series and to said first common circuit point, said switching means being operative to couple the output of one or the other of said serially connected inverter circuits to said output terminal depending upon the direction of rotation of said drive motion.

5. Tachometer apparatus as recited in claim 4 wherein said switching means further includes a first field effect transistor for coupling the output of one of said serially connected inverter circuits to said output terminal, and a second field effect transistor for alternatively coupling the output of the other of said serially connected inverter circuits to said output terminal.

6. Tachometer apparatus as recited in claim 3 wherein said inverter circuits each have a second output coupled to a second common circuit point.

7. Tachometer apparatus as recited in claim 6 wherein said output means includes a first inverter circuit connected to said first common circuit point and operational to develop one of said pair of output signals, and a second inverter circuit connected to said second common circuit point and operational to develop the other of said pair of output signals, said switching means being operative to couple the output of said first or said second inverter circuits to said output terminal depending upon the direction of rotation of said drive motion.

8. Tachometer apparatus as recited in claim 7 wherein said switching means further includes a first field effect transistor for coupling the output of said first inverter circuit to said output terminal, and a second field effect transistor for alternatively coupling the output of said second inverter circuit to said output terminal.

9. Tachometer apparatus, comprising:
   a brushless generator responsive to rotary motion and operative to develop a series of AC signals having peak amplitudes proportional to the rotational velocity of said rotary motion and including;
   an annular magnetic member having a smooth cylindrical inner surface of a first diameter,
   a rotor disposed along the longitudinal axis of said annular member and including a pair of oppositely polarized magnetic poles terminating in pole faces shaped as cylindrical segments which are concentric with said inner surface and have a second diameter smaller than said first diameter, the sector angle of each of said segments being substantially equivalent to an angle of 360°/n, the space separating said inner surface and said pole faces forming an annular gap of uniform radial dimension,
   an odd-numbered plurality of electrically conductive coils, each comprising a pair of elongated wire bundles disposed within said gap and lying in parallel relationship with said axis, the respective bundles of each coil being disposed on opposite sides of said axis and lying in planes including said axis, adjacent ones of said bundles being angularly positioned about said axis at intervals of 180°/n, where n is the number of coils;
   circuit means coupled to said conductive coils for rectifying and summing said AC signals to develop a continuous DC potential having a magnitude proportional to the rotational velocity of said rotor;
   output means responsive to said DC signal and operative to develop a pair of output signals proportional to said DC signal, said output signals being of like magnitude but of opposite polarity; and
   switching means responsive to the direction of rotation of said rotor and operative to couple one of said output signals to an output terminal when said motion is in one direction, and to couple the other of said output signals to said output terminal when said motion is in the opposite direction.

10. Tachometer apparatus as recited in claim 9 wherein said magnetic poles include a main body of permanent magnetic material and pole pieces of magnetically soft material affixed to said main body to form at least a portion of said pole faces, the relative dimensions of said pole pieces and said main body being such that the electromotive forces developed in said coils have substantially trapezoidal wave-shapes.

11. Tachometer apparatus as recited in claim 9 and further including a cup-shaped non-magnetic member having cylindrical walls with an outer diametr smaller than said first diameter and an inner diameter larger than said second diameter, said walls having slots provided in the outer surface thereof for receiving said wire bundles.

12. Tachometer apparatus as recited in claim 11 wherein said cup-shaped member is open at one end and is closed at the opposite end by an end wall having an aperture for receiving a shaft supporting said rotor.

13. Tachometer apparatus as recited in claim 9 and further comprising a coil holder including an annular non-magnetic member disposed within said gap and having an outer diameter smaller than said first diameter and an inner diameter larger than said second diameter, said member having longitudinal slots provided therein for receiving said wire bundles.

14. Tachometer apparatus as recited in claim 13 wherein said coil holder further includes at least one lid member mating with one end of said annular member and having a central opening provided therein through which the shaft supporting said rotor is passed.

15. Tachometer apparatus as recited in claim 9 wherein said circuit means includes a plurality of unidirectional inverter circuits, each having an input coupled to a corresponding one of said stator windings, and a first output coupled to a first common circuit point.

16. Tachometer apparatus as recited in claim 15 wherein said output means includes a pair of inverter circuits connected in series and to said first common circuit point, said switching means being operative to couple the output of one or the other of said serially connected inverter circuits to said output terminal depending upon the direction of rotation of said drive motion.

17. Tachometer apparatus as recited in claim 16 wherein said switching means includes a first field effect transistor for coupling the output of one of said serially connected inverter circuits to said output terminal, and a second field effect transistor for alternatively coupling the output of the other of said serially connected inverter circuits to said output terminal.

* * * * *